United States Patent

Tisbo et al.

[11] Patent Number: 6,086,073
[45] Date of Patent: Jul. 11, 2000

[54] PORTABLE WORK CENTER

[75] Inventors: Thomas A. Tisbo, Barrington Hills; Torrence C. Anderson; Michael R. Vogler, both of Aurora, all of Ill.

[73] Assignee: Suncast Corporation, Batavia, Ill.

[21] Appl. No.: 09/120,710

[22] Filed: Jul. 22, 1998

[51] Int. Cl.[7] .................................................. B62B 1/00

[52] U.S. Cl. ................................... 280/47.26; 280/79.2

[58] Field of Search .............................. 280/47.19, 47.34, 280/47.35, 47.2, 47.24, 47.26, 79.11, 79.2, 79.3; D34/19, 20, 21, 24, 25; 403/371, 381

[56] References Cited

U.S. PATENT DOCUMENTS

| | | | |
|---|---|---|---|
| D. 248,549 | 7/1978 | Lopez | D34/21 |
| D. 357,600 | 4/1995 | Chen | D34/19 |
| 1,761,453 | 6/1930 | Rankin | 280/79.2 |
| 2,774,609 | 12/1956 | Winger | 280/79.11 |
| 3,118,685 | 1/1964 | Jordan | 280/47.26 |
| 3,271,044 | 9/1966 | Bosko et al. | 280/47.35 |
| 3,380,097 | 4/1968 | Pharris | 403/371 |
| 3,721,349 | 3/1973 | Jaffee et al. | 280/79.3 |
| 3,868,123 | 2/1975 | Berg et al. | 280/79.2 |
| 4,125,338 | 11/1978 | Lew | 403/381 |
| 4,595,107 | 6/1986 | Welsch | 280/47.35 |
| 4,743,040 | 5/1988 | Breveglieri et al. | 280/47.35 |
| 5,207,723 | 5/1993 | Newby, Sr. | 280/47.26 |
| 5,427,394 | 6/1995 | Lauto | 280/47.35 |
| 5,566,961 | 10/1996 | Snell et al. | 280/47.35 |
| 5,605,344 | 2/1997 | Insalaco et al. | 280/47.34 |

FOREIGN PATENT DOCUMENTS

| | | | |
|---|---|---|---|
| 424677 | 5/1967 | Switzerland | 280/47.35 |
| 651791 | 10/1985 | Switzerland | 280/79.2 |
| 2207097 | 1/1989 | United Kingdom | 280/47.35 |

OTHER PUBLICATIONS

Suncast Corporation, Advertisement for Gardening Center, 2 pages, No Date.
The Barbeque Store, Advertisement for BBQ Kargo Kart, 1 page, 1997.
Prairie Leisure Design, Advertisement for the Chef Mate Grill Center, 1 page, No Date.
Rubbermaid, Advertisement for Mobile Work Station, 1 page, No Date.

(List continued on next page.)

*Primary Examiner*—J. J. Swann
*Assistant Examiner*—F. B. Vanaman
*Attorney, Agent, or Firm*—Welsh & Katz, Ltd.

[57] ABSTRACT

A portable work center includes a molded base panel having a plurality of clamping members, at least one wheel assembly support and at least one support leg in spaced relation to the wheel assembly support. A molded top panel is in spaced, parallel relation to the base panel, and has a plurality of clamping members, each corresponding to a clamping member on the base panel. A pair of opposingly oriented side panels extend between and connect the top and base panels to one another. A rear panel is positioned adjacent and between the side panels and extends between the top and base panels. A pair of pivotal front door panels is disposed in opposing relation to the rear panel and extends substantially between the top and base panels and the side panels. Together, the side panels, rear panel, top panel, base panel and door panels define an internal storage region and four corners. Corner support posts are positioned at each of the corners and extend between the base panel and the top panel. The posts traverse through and join the respective side panels with the rear panel and join the respective side panels with the front door panels. The posts positioned at the front corners are pintles defining axes for pivoting the front door panels relative to the side panels. Clamping member secure the posts to the top and base panels, and a wheel assembly is operable connected to the base at the wheel assembly support.

14 Claims, 6 Drawing Sheets

OTHER PUBLICATIONS

Rubbermaid, Advertisement for Trades Cart , 1 page, No Date.

Rubbermaid, Advertisement for Heavy Duty Work Bench, 1 page (Obtain from Rubbermaid Inc. WebSite), 1998.

Gardener's Eden, Summer 1996 Catalog, Advertisement for Work Bench, 1 page.

Gardener's Eden, Summer 1996 Catalog, Advertisement for Picket Fence Work Bench, 1 page.

Dick Blick, Work Benches, Advertisement, 1 page, No Date.

Gardener's Supply Company Catalog, Spring 1996, Advertisement for Cedar Potting Bench, 3 pages.

PORTABLE WORK CENTER

FIELD OF THE INVENTION

This invention pertains to a portable work center. More particularly, the invention pertains to a portable work center formed from molded plastic panels having reinforced steel corner posts and a tool-storage worktop.

BACKGROUND OF THE INVENTION

Work centers have become quite popular for indoor and outdoor use. Many such work centers are portable, that is, they include wheels so that the work center can be readily transported from one location to another. One known work center is configured as a mobile workstation and includes four wheels or casters positioned at the corners of the workstation. The station includes a plurality of slide-out drawers and a worktop. The station is formed from a molded plastic frame and includes metal runners for the slide-out drawers. The workstation can include, for example, tool receptacles and a recessed front dish for storage of small parts.

Another known mobile workstation includes four wheels positioned at each of the corners and an open central region for storing large materials. Essentially, this known work station is a reinforced, open cart.

Still another type of "station" is configured as a stationary barbecue center. The barbecue center includes open shelf space and a slotted top rack or support surface for holding, for example, barbecue tools. The barbecue center includes an elevated shelf region positioned at the rear of the uppermost support surface for supporting various implements and condiments that may be used when barbecuing.

While these work stations all function well for their respective intended purposes, they do in fact have their drawbacks. First, the known stations do not include a locking, central storage region that can be used to store larger items, such as electric hand tools or other relatively valuable items that it may be desirable to store in a locked place. Second, while the known work stations provide either complete mobility or a complete stationary function, such stations that include four wheels can be prone to inadvertently roll or otherwise drift away from a desired set location. This can be particularly troublesome when one is working on the top surface of such a work station.

An additional drawback is that the known workstations do not, for the most part, provide sufficient area for storage of, for example, hand tools. Nor do most such stations include preconfigured, readily accessible tool storage regions. As such, small hand tools such as pliers, wrenches, screwdrivers and the like can become scattered and/or lost as a result of this lack of preconfigured or preset storage regions.

Accordingly, there exists a need for a portable storage system that includes a locking, central storage regions for securely storing, for example, electric power tools and the like. In such a system, a desirable storage region includes shelves or bins to increase the usable storage area. Desirably, such a system includes a plurality of preconfigured storage regions for storing small hand tools and the like. Most desirably, such a portable work center includes an additional elevated storage region or shelf for increasing the storage area for small items that can easily become lost, such as hardware items and the like, and to provide ready access to such items.

SUMMARY OF THE INVENTION

A portable work center provides a structurally stable work surface and a safe and secure tool storage arrangement. The work center includes a molded base panel having a plurality of clamping members, a wheel assembly support and support legs in spaced relation to the wheel assembly support. A molded top panel is positioned in spaced, parallel relation to the base panel and has a plurality of clamping members, each corresponding to a clamping member on the base panel.

A pair of opposingly oriented side panels extend between and connect the top and base panels to one another. A rear panel is positioned adjacent and between the side panels and extends between the top and base panels. A pair of pivotal front door panels are disposed in opposing relation to the rear panel and extend substantially between the top and base panels and the side panels. Together, the side panels, rear panel, top panel, base panel and door panels define an internal storage region and four corners.

Corner support posts are positioned at each of the corners and extend between the base panel and the top panel. The posts traverse through and join the respective side panels with the rear panel, and traverse through and join the respective side panels with the front door panels. The posts positioned at the front corners are pintles defining axes for pivoting the front door panels relative to the side panels.

Clamping members secure the posts to the top and base panels. Preferably, the clamping members include a partially threaded sleeve formed in and extending from the base and top panels. A threaded nut is configured for engaging the sleeve. The sleeve includes longitudinal slots formed therein to compress inwardly when the nut is threaded thereon, to secure the support post in the sleeve.

The work center includes a wheel, such as a pair of wheels mounted to an axle that is connected to the base at the wheel assembly support. In a preferred arrangement, a riser shelf is mounted to and parallel with the top panel by a pair of riser supports.

The work center includes recessed storage areas in the top panel that are defined by an upwardly extending peripheral lips. The storage areas can be configured as trays for storing, for example, fasteners and the like. The storage areas can also be configured as slotted, preconfigured tool storage openings. The riser shelf can, likewise include such recessed storage areas.

In a most preferred embodiment, the work center includes a handle formed in the top panel, in diagonally opposing relation to the wheel assembly support. In this manner, the work center is readily transportable by grasping the handle and lifting the work center so as to move the center along on the wheels.

The work center can include rails formed in the each of the side panels corresponding to rails formed in the other side panel. The rails are configured to receive a bin or shelf thereon and to locking maintain the bin or shelf in a selected position. In a current embodiment, the rails include projections formed therein adapted to coact with notches formed in the bin or shelf.

The front door panels include aligned openings in adjacent faces for receiving a lock to secure the internal storage region. This arrangement provides for safe storage of, for example, power tools and the like that are desirably maintained in a locked cabinet or the like.

To facilitate assembly, the top and base panels include a peripheral channel formed therein that extends around at least a portion of the panel. The side and rear panels include a tab-like projection that extends from and is configured for receipt in the channel to secure that panel to the base or top panel.

Other features and advantages of the present invention will be apparent from the following detailed description, the accompanying drawings, and the appended claims.

DETAILED DESCRIPTION OF THE PREFERRED EMBODIMENTS

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
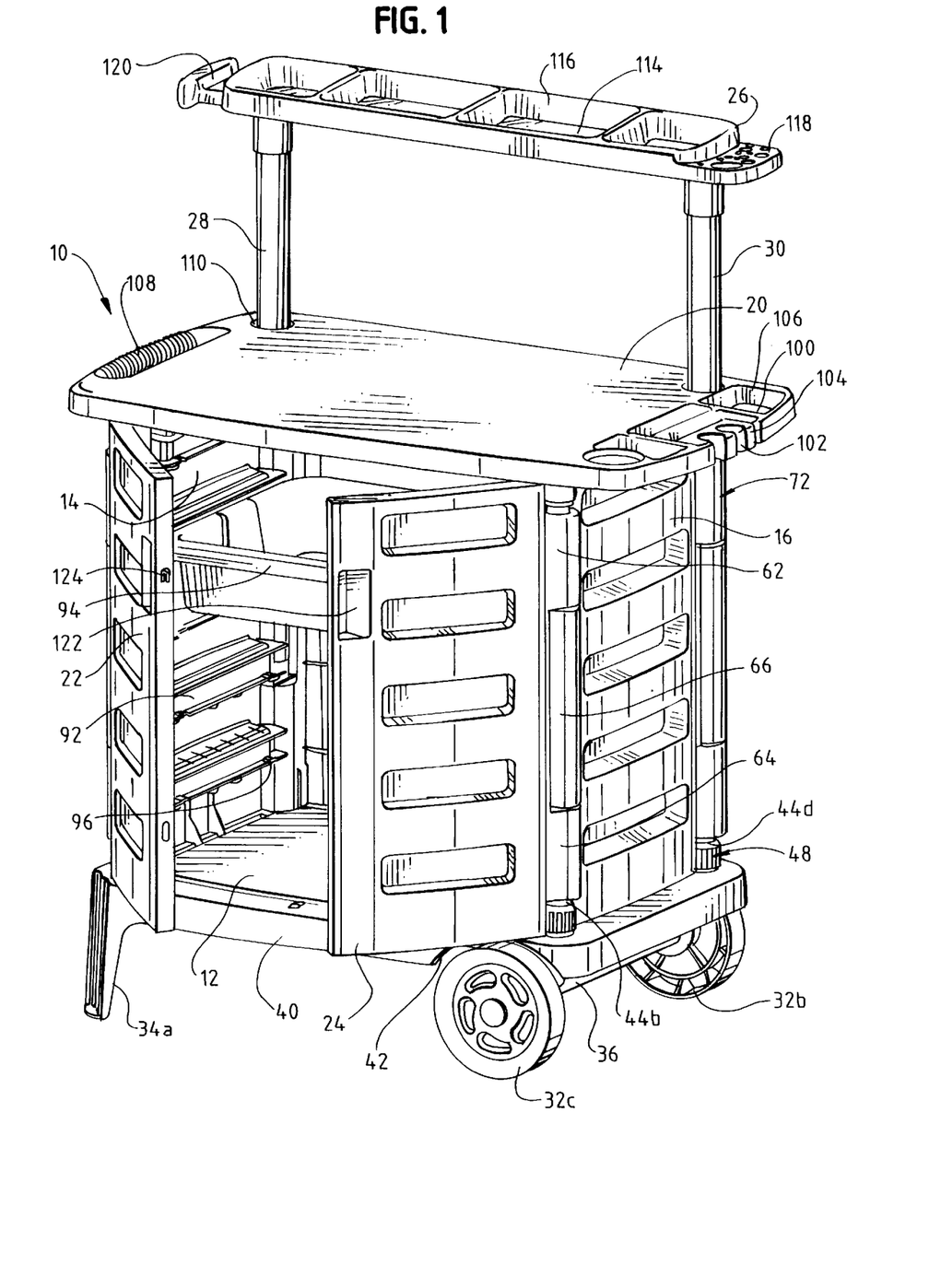
FIG. 1 is a front perspective view of a portable workstation in accordance with the present invention, the workstation being shown with the front doors ajar in the interior storage regions thereof visible.
Figure 2:
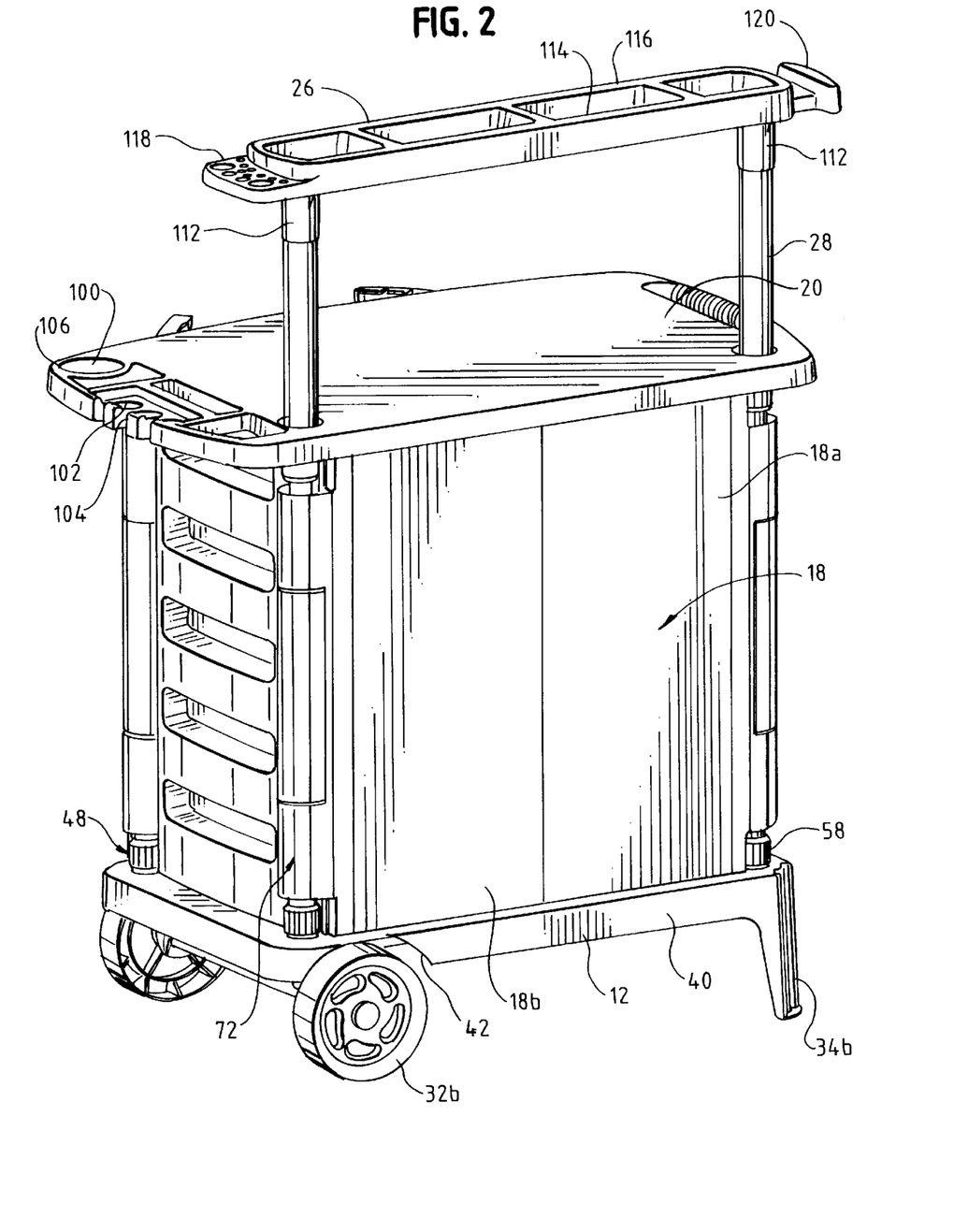
FIG. 2 is a rear perspective view of the portable work center of FIG. 1.

Referring now to the figures and in particular FIG. 1, there is shown a portable work center 10 in accordance with the principles of the present invention. The work center 10 includes a base 12 that is preferably substantially rectangular, opposingly oriented side panels 14, 16 that extend upwardly from the base 12, abutting, side-by-side rear panel sections 18a,b that are secured to one another to define a rear panel 18, a top 20, and outwardly pivotal front door panels 22, 24. The work center 10 includes a riser shelf 26 that is positioned above the top panel 20 and is mounted thereto by first and second riser tubes 28, 30. It will be apparent from the drawings that the base 12 is generally rectangular in shape, having outwardly arched sides. This can be the overall shape of the sides 14, 16, rear panel 18, and front door panels 22, 24 as well.

The base 12 includes a wheel assembly having a pair of wheels 32a,b positioned along one side thereof, and a pair of support legs 34a,b positioned at an opposing side thereof. The wheels 32a,b are mounted to the base 12 by an axle 36 that is received in a wheel assembly support, such as the illustrated first and second axle mounts 38a,b. The base 12 includes a depending lip 40 that has a pair of arcuate cut-out sections, indicated at 42, for proper fit of the wheels 32a,b to the base 12. The base 12 further includes a plurality of reinforcing ribs 21 formed in an underside thereof The ribs provide additional structural strength (i.e., rigidity) to the base 12 and reduce torsional flexing of the base 12 and work center 10.

The panels 12–24 join to one another at corners through which steel support posts 44 extend. In a preferred embodiment, the posts 44 have an external, impact-resistant plastic sleeve 46 which provides a plastic casing, sheath or outer sleeve. The support posts 44 are maintained in place at the corners, at the base 12 and at the top 20, by clamping means such as the exemplary, illustrated clamping members 48 which will be described in more detail herein.

The base 12 and top 20 include slots or channels 50 extending along the periphery thereof. The side 14, 16 and rear 18 panels each include one or more tab-like aligning elements 52 that extend from the top and bottom of each panel 12–24 that are received in respective portions of the base and top peripheral channels 50. Engagement of the tab-like elements 52 with the channels 50 ensures that the side 14, 16 and rear 18 panels are aligned with the base 12 and top 20 when the center 10 is assembled.

The corner support posts 44 extend between the base 12 and top 20 at each of the four corners of the work center 10. To this end, the clamping members 48 secure the posts 44 to the base 12 and top 20. The exemplary clamping member 48, best seen in FIG. 7 includes a partially threaded sleeve 54 extending from the base 12 or top 12, which sleeve 54 includes longitudinal slots 56 formed therein. The clamping member 48 includes a knurled, fluted, internally threaded coupling nut 58 having an inwardly tapered inner surface 60. The nut 58 securely, threadedly engages the sleeve 54 so that the tapered surface 60 compresses the sleeve 54 about the slots 56 and thus clamps the sleeve 54 onto the post 44, thus securely joining the post 44 to the base 12 or top 20 within the clamp 48.

Figure 3:
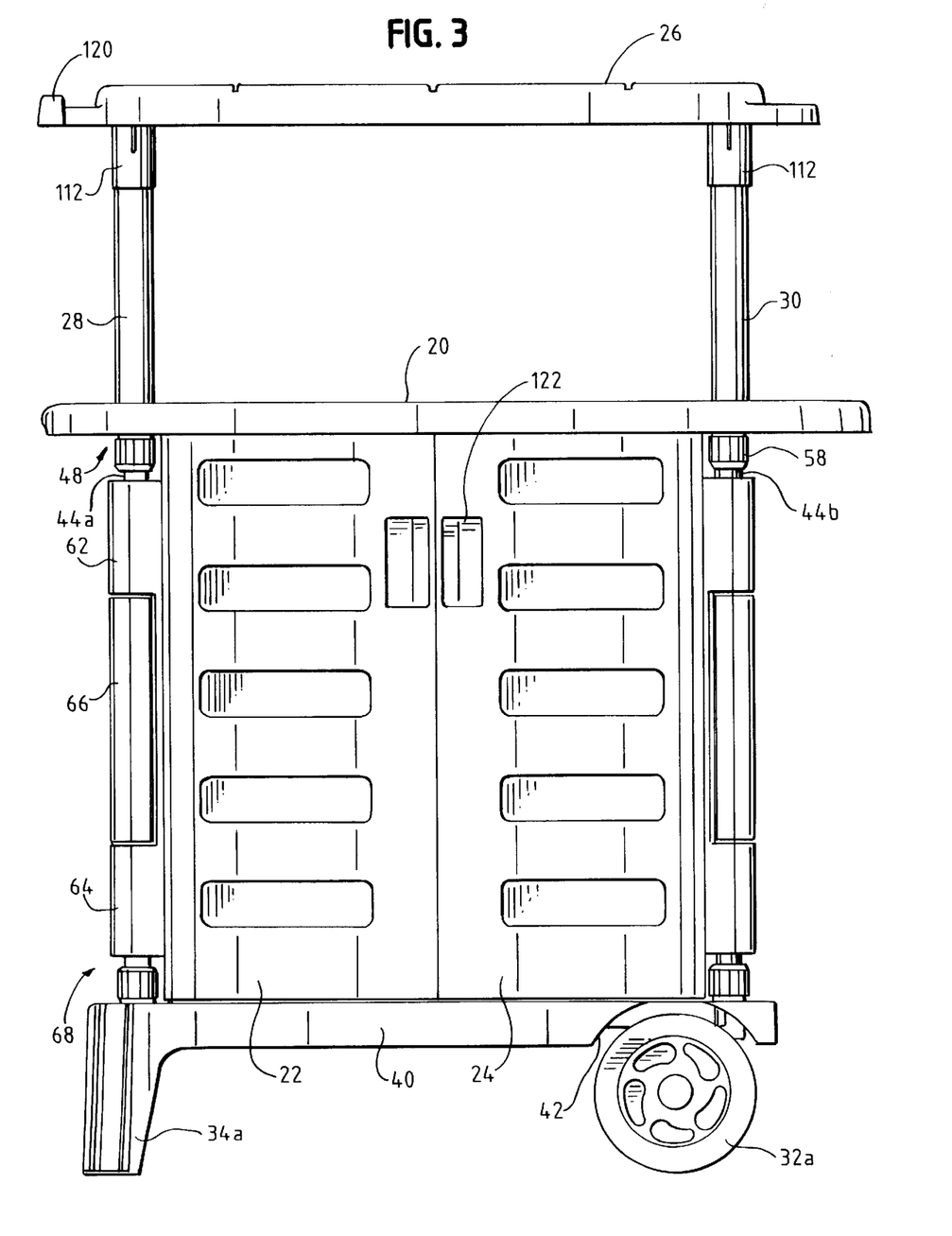
FIG. 3 is a front view of the portable work center.
Figure 4:
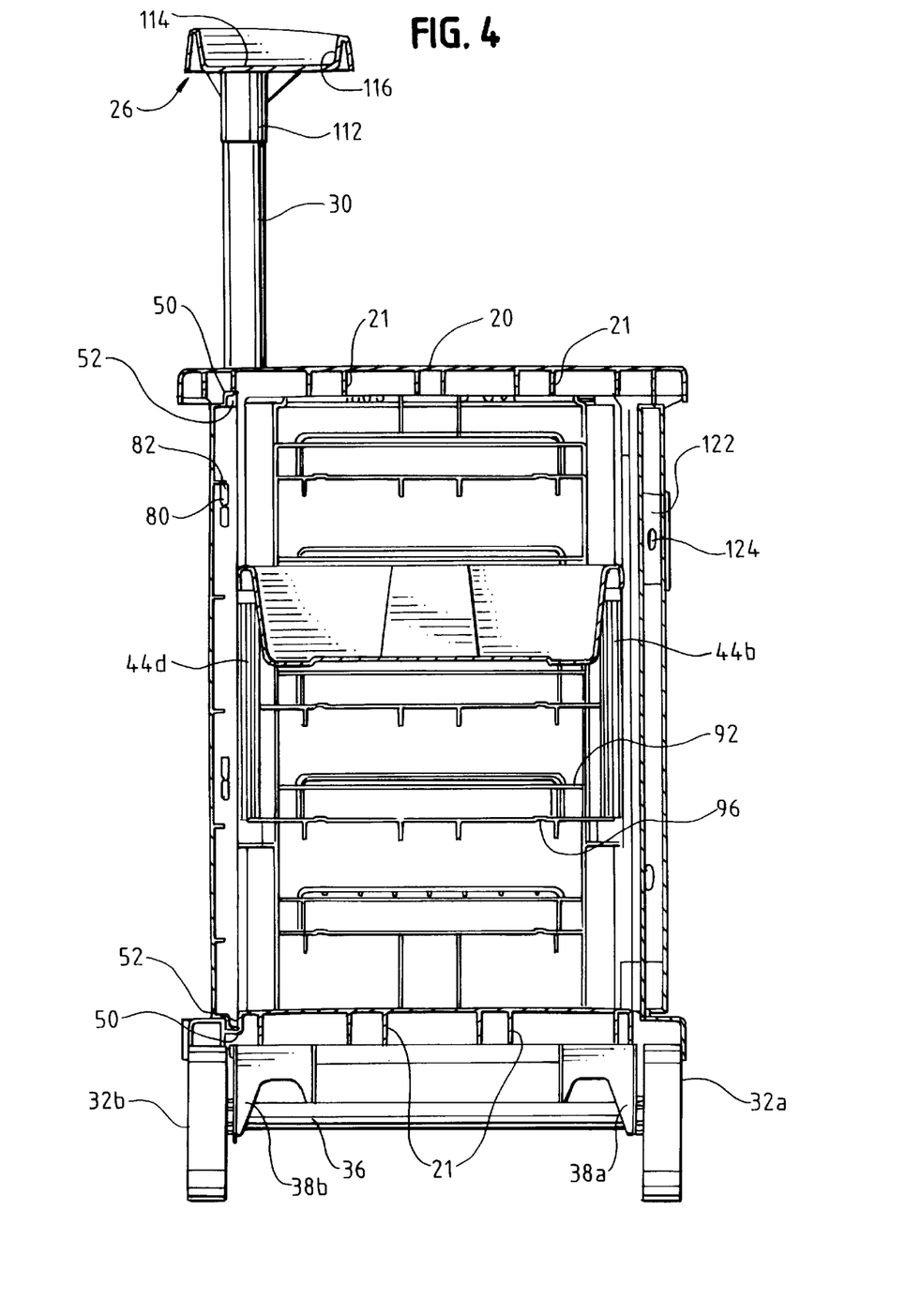
FIG. 4 is a side view of the work center of FIG. 1, the center being shown without the side panel in place to clearly illustrate the interior portion of the work center.

The front support posts 44a,b serve not only as structural members, but also as hinge pintles for pivoting the front door panels 22, 24. As best seen in FIGS. 1 and 3, each door panel 22, 24 includes upper and lower, longitudinally spaced apart hinge elements 62, 64 extending from an edge of the door 22, 24. Preferably, the hinge elements 62, 64 are formed as a pair of collinear sleeves that extend from the door edge face at the upper and lower ends thereof. The door hinge elements 62, 64 are configured so that a fixed hinge support member 66 extending from an edge of each side panel 14, 16 is disposed intermediate the upper and lower hinge elements 62, 64. The hinge support member 66 can also be formed as a sleeve extending from an edge of the side panel 14, 16. When the side and door panels 14/22, 16/24 are assembled to one another about their respective posts 44a, b, the hinge support members 66 and hinge elements 62, 64 form hinge regions, illustrated at 68, that extend substantially the height of the work center doors 22, 24, less the linear distance illustrated at 70, that is required to accommodate the clamping members 48.

Advantageously, the present hinge region 68 configuration provides an essentially secure configuration in that the hinge, particularly at the center of the doors 22, 24 at their juncture with the side panels 14, 16, is continuous. This configuration, which is unlike known configurations, reduces or eliminates the opportunity for the doors 22, 24 to be pried open and the contents of the work center 10 taken or otherwise vandalized.

Each post 44a,b is received in or inserted through respective hinge elements 62, 64 and hinge support members 66 and the posts are secured into their respective clamping members 48. In this manner, the front doors 22, 24 pivot about the support posts 44a,b on a structurally sound support member that extends essentially the height of the work center 10. This configuration provides an effective hinge 68 arrangement without adversely effecting the structural function of the support posts 44a,b, while enhancing the work center's structural integrity.

The side panels 14, 16 are joined to the rear panel 18 with the support posts 44c,d extending through joining members 72 similar to the arrangement used to join the side panels 14, 16 to the front door panels 22, 24. It will, however, be recognized that the rear panel 18 is a rigid panel that is not intended to pivot about the posts 44c,d. This configuration which uses reinforced corner posts 44c,d and which is unlike known work centers, prevents the structure from sagging at the corners.

Figures 5, 7, 8:
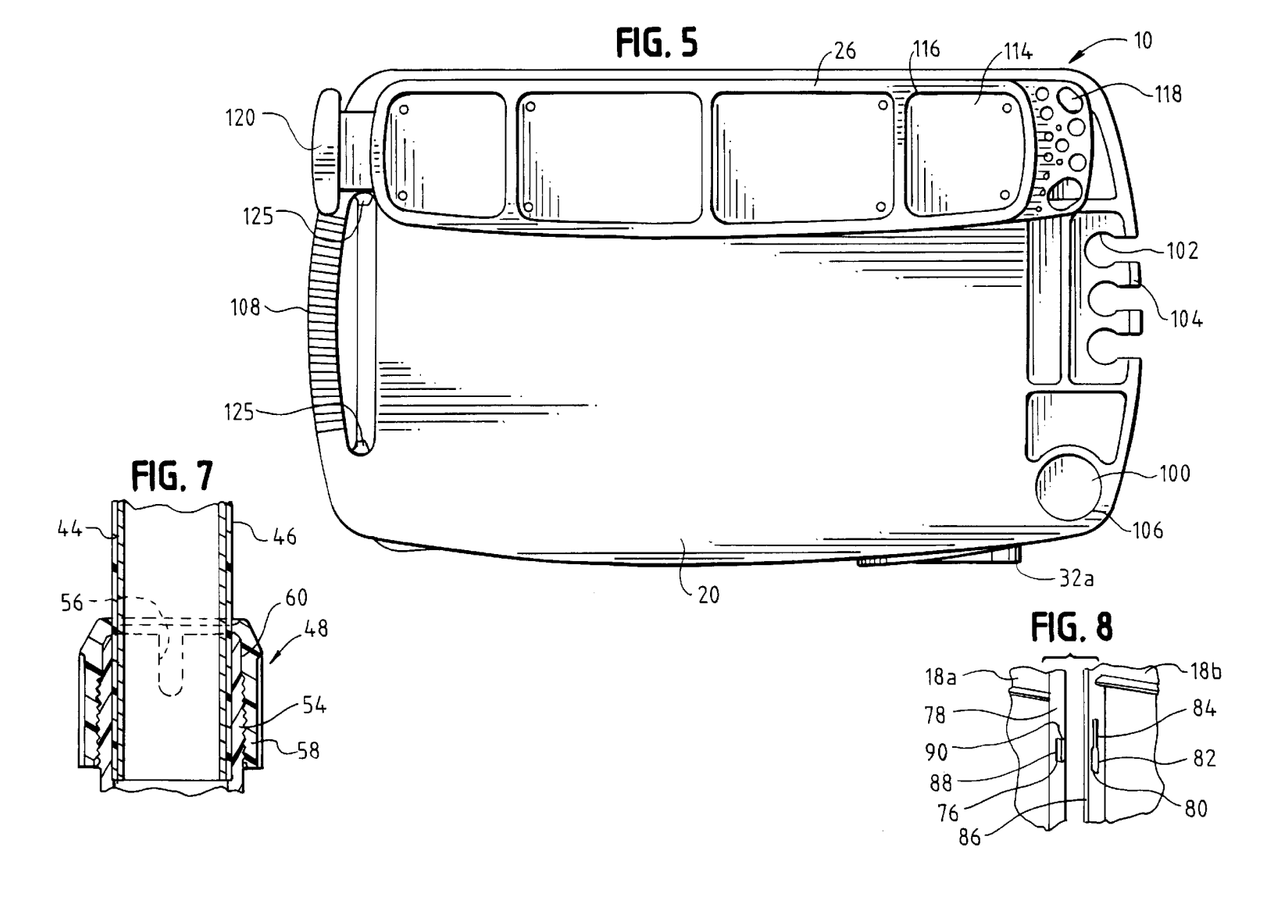
FIG. 5 is top view of the work center of FIG. 1 illustrating a plurality of preconfigured storage regions, for example, small hand tools.
FIG. 7 is a partial cross-sectional view of a clamping member for securing the posts to the base and top panels.
FIG. 8 is a perspective view of a portion of the rear panel sections illustrating the panel connecting arrangement.

Referring now to FIG. 8 there is shown a connecting arrangement indicated at 74 that is used to connect the side-by-side rear panel sections 18a,b to one another to form the rear panel 18. The rear panel 18 connecting arrangement includes a generally L- or hook-shaped projection 76 extending outwardly from an inner edge, indicated at 78 of one of the panel section 18a faces and a corresponding two-tiered opening 80 (e.g., rectangular opening 82 and slot 84 arrangement) in the opposing panel 18b edge face 86. The L-shaped projection 76 includes a base leg 88 extending from the panel edge face 78 and a transverse leg 90 extending from a free end of the base leg 88.

The projection 76 and opening 80 are configured so that the entirety of the projection 76 inserts into the first larger portion 82 of the opening 80. Once the transverse leg 90 is filly inserted through the opening 82, the two panel sections 18a,b can be longitudinally adjusted relative to one another such that the base leg 88 inserts into the smaller portion 84 (e.g., slot portion) of the two-tiered opening 80. In this manner, the panel sections 18a,b are locked to one another with the transverse leg portion 90 engaging an inner surface of the opposing panel 18b.

Figure 6:
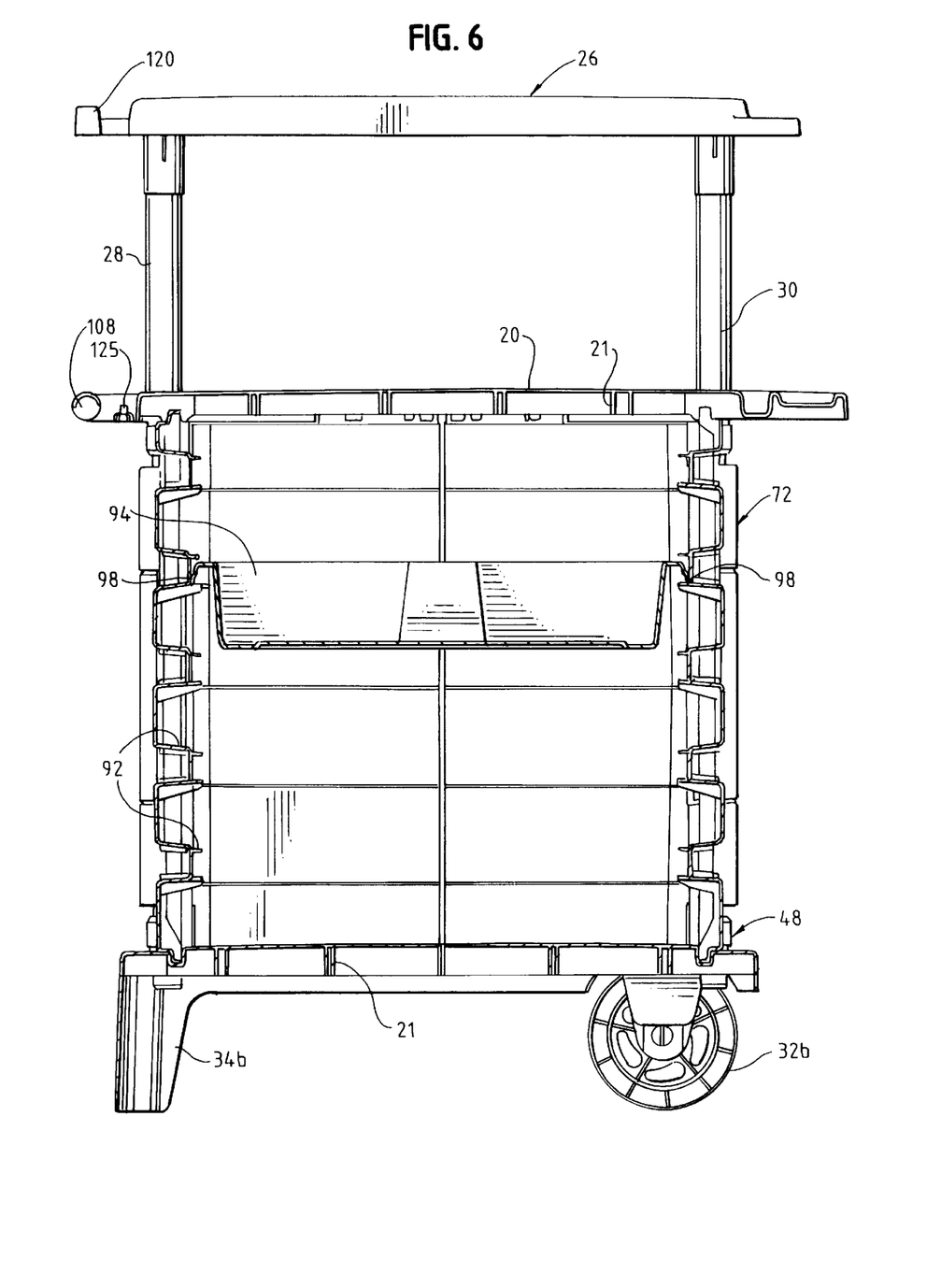
FIG. 6 is a front view of the work center illustrated in a fashion similar to FIG. 4, with the doors removed and shown in partial cross sections so as to illustrate the variable positioning of the bin within the central locked, storage region.

As best seen in FIGS. 1 and 6, the work center 10 includes a plurality of molded support ledges or rails 92 that extend inwardly from each of the side panels 14, 16. The rails 92 permit mounting a shelf or bin 94 in the interior of the work center 10. Preferably, the rails 92 are formed as inward projecting structural members integral with the side panels 14, 16. Because the panels 14, 16 are molded elements, the rails 92 can be formed as part of the panel molds to minimize the time and thus labor required to manufacture the rails 92. This further permits consistency in formation of the panels 14, 16 relative to the rails 92. Consistency is necessary in order to assure that each rail 92 of a side panel 14, 16 is at a height equal to the height of a corresponding rail 92 in an opposing side panel 14, 16. Thus, the bins 94 positioned in the works center 10 interior lie in a substantially horizontal plane and are not tilted or skewed. Preferably, the rails 92 include one or more projections 96 in an upper surface thereof configured to co-act with one or more notches 98 formed in a bottom portion of the bin 94 edge. This maintains the bins 94 securely in position when fully inserted into the work center 10.

The work center top 20 includes a plurality of dish-like recessed storage trays 100 and preconfigured, slotted storage regions 102 formed therein for storing tools and the like. In a current embodiment, the tool storage regions 102 are recessed from an edge of the top 20 and separated from the edge by a retaining lip 104. In this manner, a tool, for example, a hammer that may be set within the storage region 102 cannot simply slide over the edge of the worktop 20, but is prevented from doing so by the retaining lip 104. The dish-like storage trays 100 can be used to store, for example, small hardware items, such as fasteners and the like. The trays 100 are also configured with peripheral retaining lips 106 to prevent items from rolling out of the trays.

The work center 10 includes a handle 108 formed as part of the top panel 20, positioned at a side edge above the support legs 34a,b. The handle 108 facilitates mobility of the center 10 and permits a user to grasp the handle 108, raise the legs 34a,b off of the ground and move the center 10 along on the wheels 32a,b at the opposing lower corner thereof Opposingly oriented hooks 125 can extend inwardly from handle 108 to hold, for example, tools having a tethered strap or the hooks 125 can be used together to hold a receptacle such as a small plastic trash bag.

The riser shelf 26, as described above, is supported by first and second riser tubes 28, 30 that fit into circumferential channels 110 formed in the top 20. An outer wall of the circumferential channel 110 includes a plurality of inwardly extending engaging elements (not shown) that are configured to secure the riser tubes 28, 30 therein. The riser shelf 26 includes a pair of depending, tubular sleeves 112 extending from a bottom thereof. The sleeves 112 are configured to receive the riser tubes 28, 30 to support the shelf 26 therefrom. The sleeves 112 include a plurality of ribs formed on an inner surface thereof (not shown) that are adapted to secure the riser shelf 26 to the tubes 28, 30.

Like the work center top 20, the riser shelf 26 includes a plurality of recessed, dish-like storage trays 114 for storing items such as fasteners and the like. The trays 114 are each formed by an upwardly extending peripheral retaining lip 116 to prevent items from inadvertently falling from the shelf 26. In a current embodiment, the riser shelf 26 also includes a plurality of openings 118 at about an edge thereof. The openings 118 are configured so that small hand tools, such as screwdrivers, pliers and the like can be inserted through the openings 118 for secure storage and ready access. The shelf can also include a hanger, such as the illustrated cord hanger 120 for storage and ready access to, for example, an electrical extension cord.

As described above, the central storage region of the work center 10 can be used for secure storage of equipment, tools and the like, that it may be desirable to maintain in a locked place. To this end, each door panel 22, 24 includes a handle 122 that has an opening 124 formed therein. The handles and 122 and openings 124 are configured to receive a lock (not shown) or like device so that the doors can be secured and the tools and equipment locked therein.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A portable work center comprising:

a molded base panel having a plurality of clamping members, at least one wheel assembly support and at least one support leg in spaced relation to the wheel assembly support;

a molded top panel in spaced, parallel relation to the base panel, the top panel having a plurality of clamping members, each corresponding to a clamping member on the base panel;

a pair of opposingly oriented side panels extending between and connecting the top and base panels to one another;

a rear panel positioned adjacent and between the side panels and extending between the top and base panels;

a pair of pivotal front door panels disposed in opposing relation to the rear panel and extending substantially between the top and base panels and the side panels, the side panels, rear panel, top panel, base panel and door panels, when connected to one another defining four corners and an internal storage region;

one corner support post positioned at each of the four corners and extending between the base panel and the top panel, the posts providing vertical support to the work center and traversing through and joining the respective side panels with the rear panel defining rear corners, and traversing through and joining the respective side panels with the front door panels defining front corners, the posts positioned at the front corners being pintles defining axes for pivoting the front door panels relative to the side panels, wherein the corner support posts are secured to the top panel and to the base panel by the respective top panel and base panel clamping members; and a wheel assembly operably connected to the base at the wheel assembly support.

2. The portable work center in accordance with claim 1 including a riser shelf mounted to and parallel with the top panel, the shelf being mounted to the top panel by riser supports.

3. The portable work center in accordance with claim 1 wherein the top panel includes at least one recessed storage area defined by an upwardly extending peripheral lip.

4. The portable work center in accordance with claim 1 wherein the top panel includes at least one slotted tool storage opening.

5. The portable work center in accordance with claim 1 wherein the wheel assembly support includes a pair of axle supports for receiving an axle, the axle having a pair of wheels operably mounted thereto.

6. The portable work center in accordance with claim 1 wherein the top panel has a handle formed therein in diagonally opposing relation to the wheel assembly support.

7. The portable work center in accordance with claim 1 wherein the side panels having rails formed therein, the rails being formed in each side panel in corresponding relation to the rails formed in the other of the side panels, the rails being configured to receive a bin or shelf thereon and to maintain in a locking manner the bin or shelf in a selected position.

8. The portable work center in accordance with claim 7 wherein the rails include projections formed therein adapted to coact with notches formed in the bin or shelf.

9. The portable work center in accordance with claim 1 wherein the top panel defines openings therein adapted to receive associated tools for storage thereof.

10. The portable work center in accordance with claim 1 wherein the front door panels include aligned openings in adjacent faces thereof for receiving a locking device.

11. The portable work center in accordance with claim 1 wherein the clamping members include a partially threaded sleeve formed in and extending from the base and top panels and a threaded nut configured for engaging the sleeve, the sleeve including longitudinal slots formed therein so as compress inwardly when the nut is threaded thereon, the sleeve being further configured for receiving the support post therein and for securing the support post thereto as the nut is threaded onto the sleeve and the sleeve compresses onto the post.

12. The portable work center in accordance with claim 1 wherein the rear panel is formed from a pair of side-by-side panel sections engaged with one another to form a substantially rigid panel.

13. The portable work center in accordance with claim 1 wherein at least one of the top and base panels includes a peripheral channel formed therein extending around at least a portion thereof, and wherein at least one of the side and rear panels includes a tab shaped projection extending therefrom and configured for receipt in the channel to secure that panel to the base or top panel.

14. The portable work center in accordance with claim 1 including a pair of support legs.

* * * * *